US010366049B2

(12) United States Patent
Kwon et al.

(10) Patent No.: US 10,366,049 B2
(45) Date of Patent: Jul. 30, 2019

(54) PROCESSOR AND METHOD OF CONTROLLING THE SAME

(71) Applicant: Samsung Electronics Co., Ltd., Suwon-si (KR)

(72) Inventors: Ki-seok Kwon, Seoul (KR); Suk-jin Kim, Seoul (KR); Do-hyung Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1042 days.

(21) Appl. No.: 14/568,400

(22) Filed: Dec. 12, 2014

(65) Prior Publication Data

US 2015/0193375 A1 Jul. 9, 2015

(30) Foreign Application Priority Data

Jan. 3, 2014 (KR) ........................ 10-2014-0000834

(51) Int. Cl.

| | |
|---|---|
| ***G06F 9/30*** | (2018.01) |
| ***G06F 15/76*** | (2006.01) |
| ***G06F 15/78*** | (2006.01) |
| ***G06F 9/38*** | (2018.01) |
| ***G06F 15/167*** | (2006.01) |

(52) U.S. Cl.
CPC .......... *G06F 15/76* (2013.01); *G06F 9/30145* (2013.01); *G06F 9/3877* (2013.01); *G06F 15/167* (2013.01); *G06F 15/7867* (2013.01)

(58) Field of Classification Search
None
See application file for complete search history.

(56) References Cited

U.S. PATENT DOCUMENTS 6,487,642 B1 * 11/2002 Duruoz ............... G06F 9/45512 711/145
6,950,929 B2 * 9/2005 Chung ................... G06F 9/325 712/241
2007/0294559 A1 12/2007 Kottke
2008/0016374 A1 1/2008 Gee et al.
2010/0146311 A1 6/2010 Jahagirdar et al.
2014/0331025 A1 11/2014 Kwon et al.

FOREIGN PATENT DOCUMENTS

KR 10-2014-0131199 11/2014

OTHER PUBLICATIONS

International Search Report and Written Opinion of the International Searching Authority dated Apr. 8, 2015 in International Patent Application PCT/KR2014/012315.

* cited by examiner

*Primary Examiner* — Corey S Faherty
(74) *Attorney, Agent, or Firm* — Staas & Halsey LLP

(57) ABSTRACT

A method of controlling a processor includes receiving from a command buffer a first command corresponding to a first instruction that is processed by a second processing core and starting processing of the first command by the first processing core, storing in the command buffer a second command corresponding to a second instruction that is processed by the second processing core before the processing of the first command is completed, and starting processing of a third instruction by the second processing core before the processing of the first command is completed.

27 Claims, 14 Drawing Sheets

FIG. 15

ORIGINAL PROGRAM CODE

```
float average (int n, float * a)
{
  float  r = 1.0 ;

  #proagma acga (1)
  for { int  i + 0; i  <  n; i + + )  {
     r  =  r * a [i] ;
  }

  float inv = 1.0 / float(n) ;

  #pragma wait _ acge (1)
  r  =  pow ( r, inv ) ;

  return  r;
]
```

COMPILED VLIW CODE

```
r = 1.0;
PREPARE FOR CGA
ACGA
inv = 1.0 / float(n) ;
WAIT _ ACGA
r = pow (r, inv);
return r;
```

COMPILED CGA CODE

```
for { int  i = 0; i  <  n; i + + ) (
 r = r * a[i];
}
```

PROCESSOR AND METHOD OF CONTROLLING THE SAME

CROSS-REFERENCE TO RELATED APPLICATIONS

This application claims the priority benefit of Korean Patent Application No. 10-2014-0000834, filed on Jan. 3, 2014, in the Korean Intellectual Property Office, the disclosure of which is incorporated herein in its entirety by reference.

BACKGROUND

1. Field

One or more embodiments relate to a processor including cores that may operate in parallel and a method of controlling the processor.

2. Description of the Related Art

A reconfigurable architecture is used for changing and reconfiguring a hardware configuration of a computing apparatus for performing operations on software. The reconfigurable architecture may have the advantages of both hardware and software, that is, a fast operation speed and superior versatility for performing various operations.

In particular, the reconfigurable architecture may perform better than hardware and software when operating a loop for repeatedly performing the same operation. Also, the reconfigurable architecture may achieve better results when combined with a pipeline technology for repeatedly performing a next operation after one operation is performed. Accordingly, a plurality of instructions may be executed at high speed.

Various types of processors having different structures have been developed, for example, a very long instruction word (VLIW) processor, a superscalar processor, etc. Scheduling instructions to be processed by a VLIW processor may be performed by a compiler, not by hardware. In contrast, scheduling instructions to be processed by a superscalar processor may be performed by hardware. Accordingly, the VLIW processor may have a simpler structure than the superscalar processor. However, it is difficult to make a compiler for a processor by using the VLIW processor, compared to the case when the superscalar processor is used. Also, the compatibility of a program compiled by the VLIW processor may be lower than the compatibility of the same program compiled by the superscalar processor.

SUMMARY

One or more embodiments may include a processor including cores that may operate in parallel and a method of controlling the processor.

One or more embodiments may include a processor having an improved processing speed and a method of controlling the processor.

One or more embodiments may include a processor that may reduce a load on a compiler or work load of a programmer by using parallel processing and a method of controlling the processor.

According to one or more embodiments, there is provided a method of controlling a processor which includes receiving from a command buffer a first command corresponding to a first instruction that is processed by a second processing core and starting processing of the first command by the first processing core, storing in the command buffer a second command corresponding to a second instruction that is processed by the second processing core before the processing of the first command is completed, and starting processing of a third instruction by the second processing core before the processing of the first command is completed.

The method may further include, after the starting processing of the third instruction by the second processing core, receiving the second command from the command buffer and starting processing of the second command by the first processing core.

According to one or more there is provided a method of controlling a processor which includes processing a first instruction by a first processing core, storing a first command corresponding to the first instruction in a command buffer, receiving the first command from the command buffer and starting processing of the first command by a second processing core, processing a second instruction by the first processing core, before the processing of the first command is completed, storing a second command corresponding to the second instruction in the command buffer before the processing of the first command is completed; and starting processing of a third instruction by the first processing core, before the processing of the first command is completed.

The method may further include, after the starting of the processing of the third instruction by the first processing core, receiving the second command from the command buffer by the second processing core and starting processing the second command.

According to one or more there is provided a method of controlling a processor which includes fetching an instruction and decoding the fetched instruction, which is performed by a first processing core, identifying a type of the decoded instruction, storing a command according to the type of the instruction in a command buffer, and receiving the command from the command buffer and starting processing the command, which are performed by a second processing core.

The command may include information about a type of the command and a parameter needed for processing the command, and the storing of the command may include waiting until the command buffer is available and storing the command in the command buffer.

The method may further include, after the receiving of the command and the starting of the processing of the command, waiting until output data that is generated as a result of the processing of the command by the second processing core is stored in the command buffer by the first processing core, and receiving the output data from the command buffer by the first processing core.

The method may further include, between the storing of the command and the receiving the command and the starting of the processing of the command, processing a next instruction to the instruction by the first processing core.

The method may further include, after the processing of the next instruction, allowing the first processing core to wait until the command is transmitted from the command buffer to the second processing core, and allowing the first processing core to wait until the processing of the command by the second processing core is completed.

The method may further include, after the processing of the next instruction, deleting the command from the command buffer.

The method may further include, after the processing of the next instruction, terminating the processing of the command by the second processing core.

The method may further include, after the terminating of the processing of the command, processing a next instruction by the first processing core, while the processing of the command is terminated.

According to one or more embodiments, there is provided a processor which includes a first processing core to process a first instruction, a command buffer to receive a first command corresponding to the first instruction from the first processing core and to store the first command, and a second processing core to receive the first command from the command buffer and to process the first command, in which the command buffer receives a second command from the first processing core and stores the second command before the processing of the first command is completed, and in which the first processing core starts processing of a second instruction corresponding to the second command before the processing of the first command is completed.

The second processing core may receive the second command from the command buffer and process the second command after the processing of the first command is completed.

According to one or more embodiments, there is provided a processor which includes a first processing core to process a fetched first instruction and to generate a command corresponding to the first instruction, a command buffer to receive the command from the first processing core and to store the command, and a second processing core to receive the command from the command buffer, in which the command includes information about a type of the command and a parameter needed for processing the command, and in which the second processing core processes the command by using the parameter.

The command buffer may receive output data that is generated as a result of the processing of the command by the second processing core and store the output data.

The first processing core may receive the output data from the command buffer.

The command buffer may include a command information buffer to receive the command from the first processing core and to store the command, an input data buffer to receive input data needed to process the command from the first processing core and to store the input data, an output data buffer to receive output data that is generated as a result of the processing of the command from the second processing core and to store the output data, and a buffer controller to control the command information buffer, the input data buffer, and the output data buffer.

The second processing core 130 may receive the input data from input data buffer and the second processing core 130 may process the command by using the parameter and the input data.

The first processing core wait until output data that is generated as a result of the processing of the command by the second processing core is stored in the command buffer.

The first processing core may process a second instruction while the command and stored in the command buffer or the command is processed by the second processing core.

After processing the second instruction, the first processing core may wait until the processing of the command by the second processing core is completed.

After processing the second instruction, the first processing core may delete the command from the command buffer.

After processing the second instruction, the first processing core may terminate the processing of the command by the second processing core.

The first processing core may process a third instruction while the processing of the command is terminated.

The second processing core may fetch an instruction that is stored in a configuration memory, according to the received command, and processes the instruction.

The instruction fetched by the second processing core may correspond to a loop of a program.

BRIEF DESCRIPTION OF THE DRAWINGS

These and/or other aspects will become apparent and more readily appreciated from the following description of embodiments, taken in conjunction with the accompanying drawings in which:

FIG. 15 illustrates a source program and a complied program according to an embodiment;

DETAILED DESCRIPTION

Figure 1:
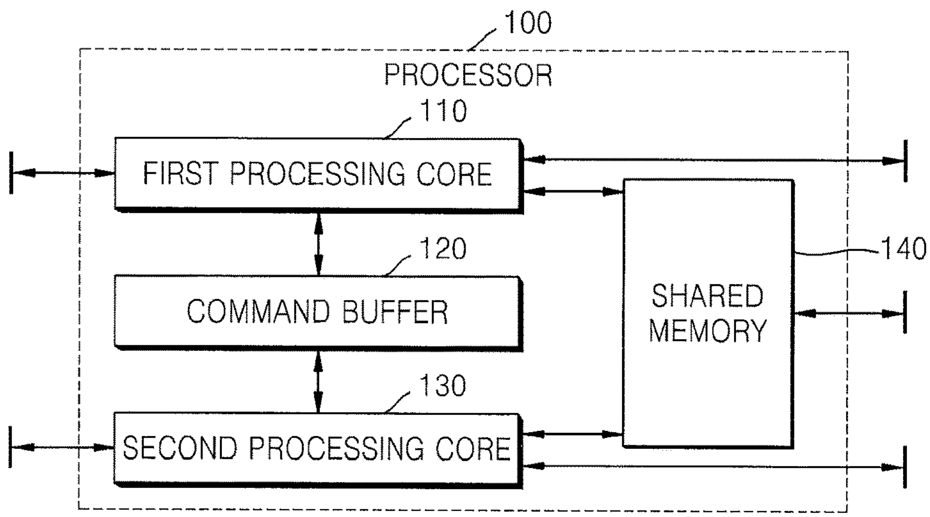
FIG. 1 is a block diagram illustrating a structure of a processor according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects of the present description.

Terms such as "first" and "second" are used herein merely to describe a variety of constituent elements, but the constituent elements are not limited by the terms. Such terms are used only for the purpose of distinguishing one constituent element from another constituent element. For example, without departing from the scope of the disclosure, a first constituent element may be referred to as a second constituent element, and vice versa.

The terminology used herein is for the purpose of describing particular embodiments only and is not intended to limit exemplary embodiments. As used herein, the singular forms "a," "an", and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

It will be further understood that singular form "program" is intended to include the plural form "programs." It will be further understood that the term "program" also includes the terms "code", "program code", "program instructions", "computer-readable code", computer-readable instructions," and one or more data structures.

Unless otherwise defined, all terms including technical and scientific terms used herein have the same meaning as commonly understood by one of ordinary skill in the art to which exemplary embodiments belong. It will be further understood that terms, such as those defined in commonly used dictionaries, should be interpreted as having meanings that are consistent with their meanings in the context of the relevant art and will not be interpreted in an idealized or overly formal sense unless expressly so defined herein.

A processor 100 according to an embodiment and a method of controlling the processor 100 will be described below with reference to FIGS. 1 to 17. FIG. 1 is a block diagram illustrating a structure of the processor 100 according to an embodiment. Referring to FIG. 1, the processor 100 according to an embodiment may include a first processing core 110, a command buffer 120, a second processing core 130, and a shared memory 140.

The first processing core 110 may be, for example, a very long instruction word (VLIW) core. The first processing core 110 may mainly process the remaining part other than a loop part of a program. Although the loop part of the program may be processed by the first processing core 110, the loop part may be mainly processed by the second processing core 130.

The processor 100 may include at least one first processing core 110. In an embodiment of FIG. 1, one first processing core 110 and one second processing core 130 are illustrated. However, according to another embodiment, at least one first processing core 110 and at least one second processing core 130 may be included in the processor 100.

Figure 2:
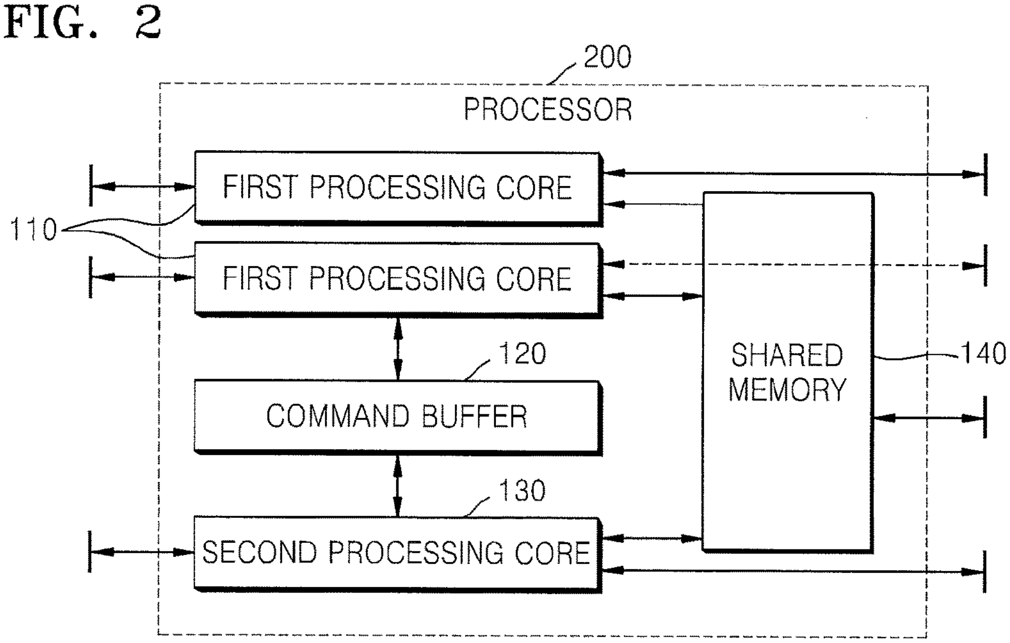
FIG. 2 is a block diagram illustrating a structure of a processor according to another embodiment.

FIG. 2 is a block diagram illustrating a structure of a processor 200 according to another embodiment. For example, as illustrated in FIG. 2, the processor 200 may include two first processing cores 110 and one second processing core 130.

Figure 3:
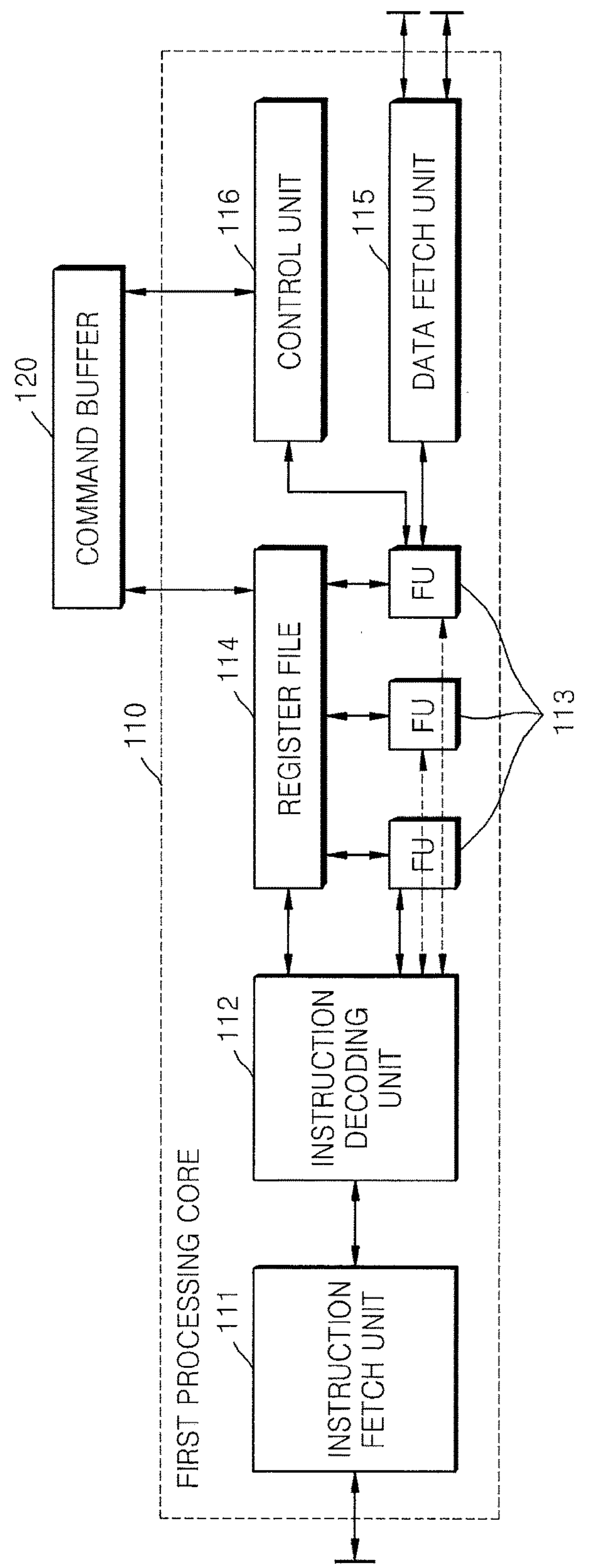
FIG. 3 is a block diagram illustrating a structure of a first processing core.

FIG. 3 is a block diagram illustrating a structure of the first processing core 110. Referring to FIG. 3, the first processing core 110 may include an instruction fetch unit (instruction fetcher) 111, an instruction decoding unit (instruction decoder) 112, a functional unit (FU) 113, a register file 114, a data fetch unit (data fetcher) 115, and a control unit (controller) 116.

The instruction fetch unit 111 may fetch an instruction from an instruction memory (not shown). The instruction fetch unit 111 may fetch instructions from the processor 100. The instruction fetch unit 111 may include, for example, an instruction cache or an instruction scratch-pad memory.

The instruction memory may have a hierarchical structure. Also, according to another embodiment, a part of the instruction memory may be included in the first processing core 110 or the second processing core 130.

The instruction decoding unit 112 may interpret the instruction fetched by the instruction fetch unit 111. The instruction decoding unit 112 may generate constant data to be used by the functional unit 113 and signals for controlling the functional unit 113 and register file 114 by decoding the instruction.

The functional unit 113 may process the decoded instruction. The functional unit 113 may store a result of the processing of the instruction in the register file 114. Also, the functional unit 113 may store the result of the processing of the instruction in an external memory (not shown). Also, the functional unit 113 may transmit the result of the processing of the instruction to the control unit 116.

The register file 114 may provide data needed for processing the instruction by the functional unit 113. Also, the register file 114 may store a result of the processing of the instruction by the functional unit 113.

The data fetch unit 115 may be connected to the functional unit 113. The data fetch unit 115 may fetch data from the external memory. Also, the data fetch unit 115 may store data in the external memory. The data fetch unit 115 may include, for example, a data cache or a data scratch-pad memory.

The control unit 116 may control other elements included in the first processing core 110. Also, the control unit 116 may exchange various signals with a variety of modules outside the first processing core 110. The control unit 116 may receive a result of the processing of a particular instruction from the functional unit 113. The control unit 116 may generate a command by using the processing result.

A command may correspond to an instruction processed by the functional unit 113. One command may correspond to one record having at least one field. For example, one command may include information about a type of the command and at least one parameter that is necessary for the second processing core 130 to process the command.

The control unit 116 may transmit a generated command to the command buffer 120. A command of a particular type may be processed by the command buffer 120. Also, commands of other types may be processed by the second processing core 130. The second processing core 130 may receive the command from the command buffer 120 and process the received command.

Figure 4:
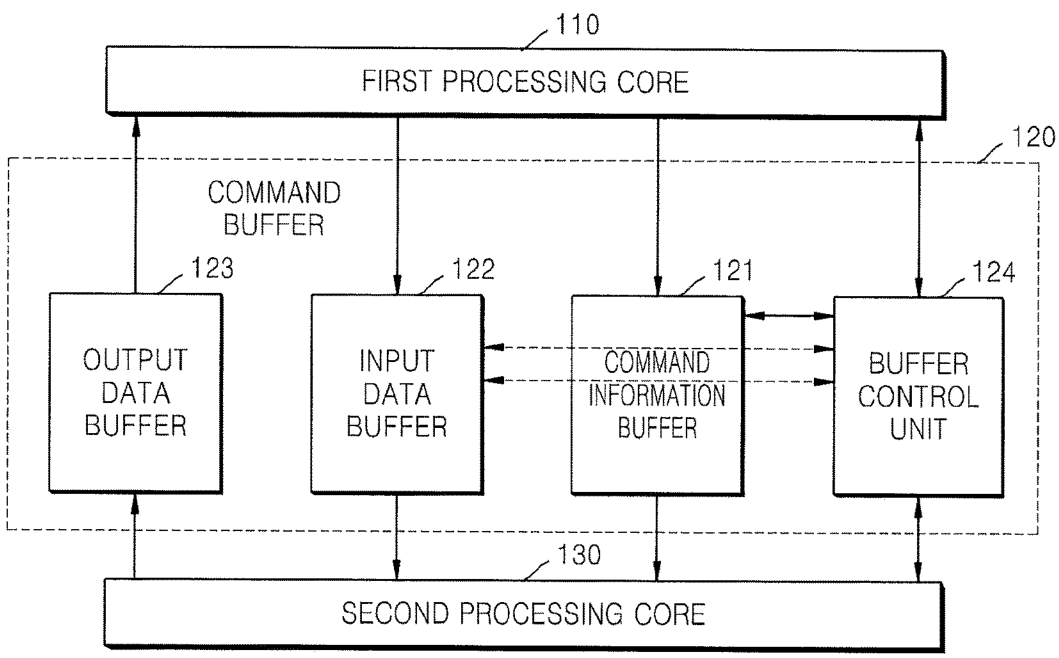
FIG. 4 is a block diagram illustrating a structure of a command buffer.

FIG. 4 is a block diagram illustrating a structure of the command buffer 120. The processor 100 may include the command buffer 120. The number of the command buffers 120 may be the same as the number of the first processing cores 110. Also, according to another embodiment, the number of the command buffers 120 in the processor 100 may the same as the number of the second processing cores 130. Also, according to another embodiment, the number of the command buffers 120 included in the processor 100 may have no relation with the number of the first processing cores 110 or the second processing cores 130.

The command buffer 120 may be connected to at least a part of first processing core 110. Also, the command buffer 120 may be connected to at least a part of second processing core 130.

The command buffer 120 may receive a command or input data from the first processing core 110 or store the received command or input data. The command buffer 120 may convert the received command to a command information record and store the command information record. Also, the command buffer 120 may transmit the stored command or input data to the second processing core 130. The command buffer 120 may convert the stored command information record to a command and transmit the command to the second processing core 130.

Also, the command buffer 120 may receive output data from the second processing core 130, the output data being generated as a result of the processing of a command by the second processing core 130, and store the received output data. The command buffer 120 may transmit the output data to the first processing core 110.

Also, the command buffer 120 may exchange control signals and messages with the first processing core 110 or the second processing core 130. Also, the command buffer 120 may store information about a loop that is currently processed by the second processing core 130.

Referring to FIG. 4, the command buffer 120 may include a command information buffer 121, an input data buffer 122, an output data buffer 123, and a buffer control unit (buffer controller) 124. The command information buffer 121 may be connected to the first processing core 110 and the second processing core 130. The command information buffer 121 may be connected to the control unit 116 of the first processing core 110 and a control unit (controller) 136 (see FIG. 7) of the second processing core 130.

The command information buffer 121 may receive a command from the first processing core 110. The command information buffer 121 may receive at least one encoded command from the first processing core 110.

FIG. 5 illustrates a structure of each type of encoded command. Referring to FIG. 5, a command may include information about the type thereof and a parameter needed for processing the command.

The command may be, for example, a coarse grained array (CGA) command, an ACGA (augmented compact genetic algorithm) command, an SCGA (self-controlled genetic algorithm) command, a WAIT_ACGA command, and a TERM_ACGA command. The information about the command type included in the command may be used to identify the command from a variety of types of commands.

For example, referring to FIG. 5, a command may include at least one field. Also, a first field may include information about a command type. Accordingly, the command type may be identified by using the information included in the first field of the command.

Figure 5A:
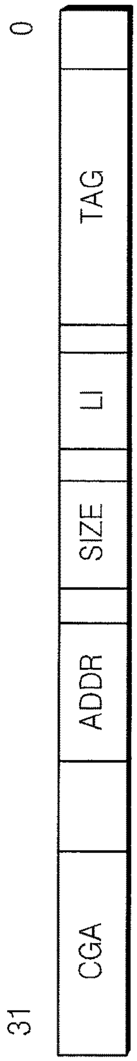
FIGS. 5A, 5B, 5C, 5D, and 5E illustrate a structure of a type of each of encoded commands.

The command illustrated in FIG. 5A may be a CGA command. The command illustrated in FIG. 5B may be an ACGA command. The command illustrated in FIG. 5C may be an SCGA command. The command illustrated in FIG. 5D may be a WAIT_ACGA command. The command illustrated in FIG. 5E may be a TERM_ACGA command.

The CGA command may be generated by the control unit 116 of the first processing core 110 as a result of the processing of a CGA instruction by the first processing core 110. The CGA instruction may be processed by the first processing core 110 when a loop part of a program starts.

The CGA command may be transmitted later from the command buffer 120 to the second processing core 130. The second processing core 130 may process the loop part. In other words, the CGA command may be a loop processing start command.

A parameter needed for processing a CGA command may include at least one of an address of a configuration memory for storing instructions corresponding to a loop, a size of a loop, an ID tag value of a loop, ID of the first processing core 110 that generated the CGA command, a type of the CGA command, the number of entries of input data used for processing the CGA command, a position where the input data is stored, or the number of entries of output data. For example, as illustrated in FIG. 5, the parameter may include an address ADDR of a configuration memory, a size SIZE of a loop, the number LI of entries of input data, and an ID tag value TAG of a loop.

A method of processing a CGA command and other types of commands will be described below with reference to FIG. 8.

The command information buffer 121 may store the command that is received from the first processing core 110. The command information buffer 121 may convert the received command to a command information record and store the command information record. The command information buffer 121 may store at least one command information record. The command information record may include at least a part of the information included in the command. The command information buffer 121 may include at least one entry and each command information record may be stored in the at least one entry.

Figure 6:
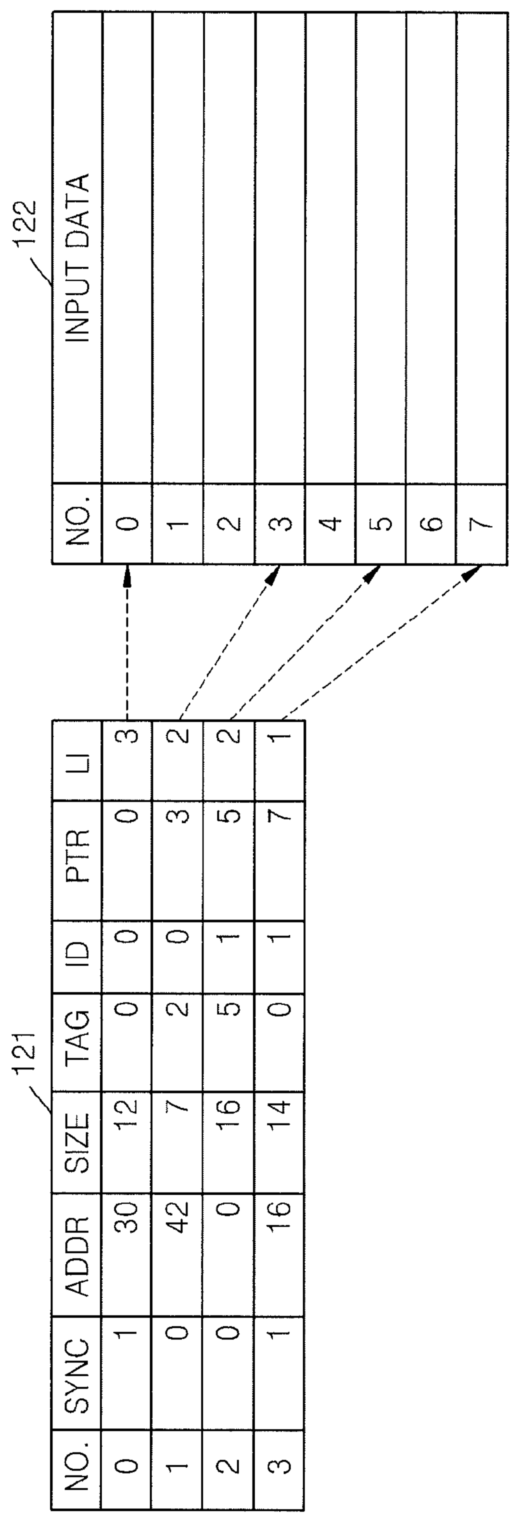
FIG. 6 illustrates a command information buffer included in a command buffer and a data structure of an input data buffer.

FIG. 6 illustrates the command information buffer 121 included in a command buffer and a data structure of the input data buffer 122. As illustrated in FIG. 6, the command information buffer 121 may include four (4) entries. Each entry may store a command information record. The command information record may include at least one of a type of a command SYNC, an address ADDR of a configuration memory, a size SIZE of a loop, an ID tag value TAG of a loop, an ID of the first processing core 110 that generated a command ID, an index PTR of input data used for processing a command, the number LI of entries of input data used for processing a command, or the number of entries of output data.

The command information buffer 121 may transmit the stored command to the second processing core 130. The command information buffer 121 may convert the stored command information record to a command and transmit the command to the second processing core 130.

The input data buffer 122 may be connected to the first processing core 110 and the second processing core 130. The input data buffer 122 may be connected to at least a part of the register file 114 of the first processing core 110 and at least a part of a register file 134 (see FIG. 7) of the second processing core 130. In this connection, the input data buffer 122 and the first processing core 110 or the second processing core 130 may be connected with each other via a multiplexer MUX.

The input data buffer 122 may receive input data needed for processing the command from the first processing core 110 and store the received input data. The stored input data may be transmitted to the second processing core 130 with the command stored in the command information buffer 121.

The input data buffer 122 may include at least one entry. Each entry may have a size capable of accommodating all values included in the register file 114 of the first processing core 110. Also, according to another embodiment, the size of the entry may be smaller than the entire size of the register file 114 of the first processing core 110. In general, the size of input data needed for processing one loop may be smaller than a sum of all registers included in the register file 114.

Also, the at least one command information record stored in the command information buffer 121 may correspond to the at least one entry stored in the input data buffer 122. In other words, input data needed for processing one command may be stored in the at least one entry of the input data buffer 122. The total number of entries of the input data buffer 122 may be larger than the total number of entries of the command information buffer 121.

For example, the entries of the input data buffer 122 may be used to store input data needed for processing a certain command. Also, since input data of a different size may be needed for processing each command, the number of entries used to store the input data needed for processing each command may vary.

Referring to FIG. 6, input data needed for processing a command corresponding to a command information record stored in the $0^{th}$ entry of the command information buffer 121 may be stored in the $0^{th}$ entry to the $2^{nd}$ entry of the input data buffer 122. Also, input data needed for processing a command corresponding to a command information record stored in the $1^{st}$ entry of the command information buffer 121 may be stored in the $3^{rd}$ entry and the $4^{th}$ entry of the input data buffer 122. Also, input data needed for processing a command corresponding to a command information record stored in the $2^{nd}$ entry of the command information buffer 121 may be stored in the $5^{th}$ entry and the $6^{th}$ entry of the input data buffer 122. Also, input data needed for processing a command corresponding to a command information record stored in the $3^{rd}$ entry of the command information buffer 121 may be stored in the $7^{th}$ entry of the input data buffer 122.

The output data buffer 123 may be connected to the first processing core 110 and the second processing core 130. The output data buffer 123 may be connected to at least a part of the register file 114 of the first processing core 110 and at least a part of the register file 134 of the second processing core 130. In this connection, the output data buffer 123 and the first processing core 110 or the second processing core 130 may be connected with each other via a multiplexer MUX.

The output data buffer 123 may receive output data that is generated as a result of the processing of a command and store the output data. The stored output data may be transmitted to the first processing core 110.

The output data buffer 123 may have at least one entry. Also, the output data buffer 123 may have only one entry. Also, the output data buffer 123 may not be included in the processor 100. When the output data buffer 123 is not included in the processor 100, the output data generated by the second processing core 130 may be transmitted directly to the register file 114 of the first processing core 110.

The number of entries of the command information buffer 121, the number of entries of the input data buffer 122, and the number of entries of the output data buffer 123 may be identical with one another. Also, according to another embodiment, at least two of the number of entries of the command information buffer 121, the number of entries of the input data buffer 122, and the number of entries of the output data buffer 123 may be different from the others.

The buffer control unit 124 may be connected to the first processing core 110 and the second processing core 130. The buffer control unit 124 may be connected to the control unit 116 of the first processing core 110 and the control unit 136 of the second processing core 130.

The buffer control unit 124 may exchange control signals or messages with the first processing core 110 and the second processing core 130. Also, the buffer control unit 124 may control the command information buffer 121, the input data buffer 122, or the output data buffer 123 by using the received control signals or messages.

The second processing core 130 may be, for example, a CGA core. The second processing core 130 may mainly process a loop part of a program. Although a part except for a loop part of a program may be controlled to be processed by the second processing core 130, the part except for a loop may be controlled by the first processing core 110. The second processing core 130 in a standby state may start an operation when a command is transmitted from the first processing core 110 to the command buffer 120.

The processor 100 may include at least one second processing core 130. In an embodiment of FIG. 1, one first processing core 110 and one second processing core 130 are illustrated. However, according to another embodiment, at least one first processing core 110 and at least one second processing core 130 may be included in the processor 100.

Figure 7:
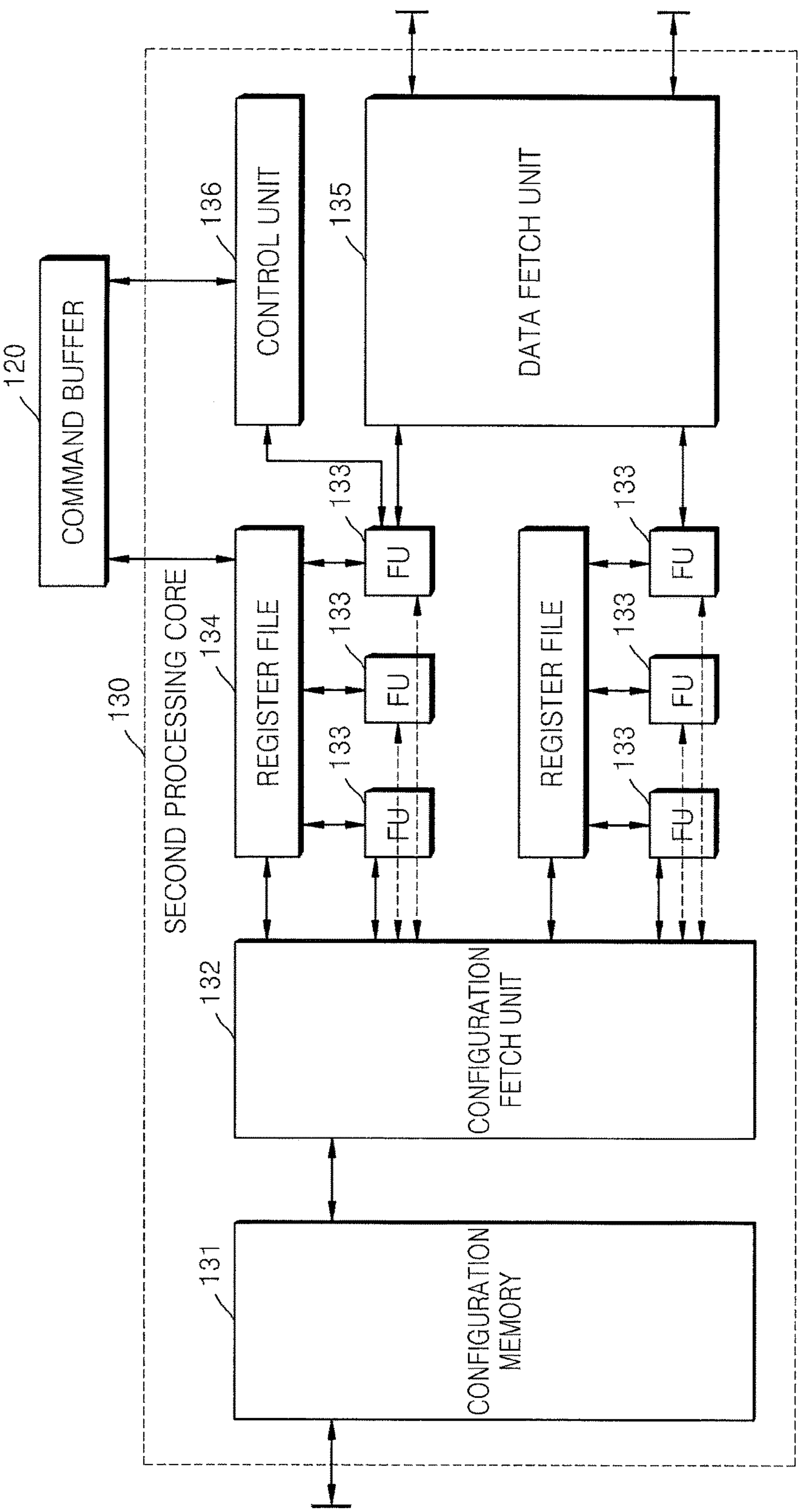
FIG. 7 is a block diagram illustrating a structure of a second processing core.

FIG. 7 is a block diagram illustrating a structure of the second processing core 130. Referring to FIG. 7, the second processing core 130 may include a configuration memory 131, a configuration fetch unit (configuration fetcher) 132, a functional unit 133, the register file 134, a data fetch unit (data fetcher) 135, and the control unit (controller) 136.

The configuration memory 131 may store at least one instruction that is processed by a CGA core of a program. For example, the configuration memory 131 may store an instruction corresponding to a loop of the program. The configuration memory 131 may have a hierarchical structure. According to another embodiment, the configuration memory 131 may exist outside the second processing core 130.

The configuration fetch unit 132 may fetch the instruction from the configuration memory 131. The configuration fetch unit 132 may generate a signal for controlling the register file 134, the functional unit 133, and an interconnection therebetween. The register file 134 and the functional unit 133 are other elements included in the second processing core 130.

The functional unit 133 may process the instruction fetched by the configuration fetch unit 132. Other operations of the functional unit 133 may correspond to the above-described operation of the functional unit 113 of the first processing core 110.

The control unit 136 may control other elements included in the second processing core 130. The control unit 136 may receive a command from the command buffer 120. The received command may be, for example, any one of a CGA command, an SCGA command, and an ACGA command. The control unit 136 may generate a control signal according to the command received from the command buffer 120 so that the configuration fetch unit 132 may fetch the instruction stored in the configuration memory 131 and the functional unit 133 may process the instruction. Accordingly, the control unit 136 may process the command received from the command buffer 120.

The control unit 136 may receive a result of the processing of a particular instruction from the functional unit 133. Also, the output data that is generated as the particular instruction is processed by the functional unit 133 may be stored in the register file 134. The control unit 136 may transmit the output data to the command buffer 120. In other words, the control unit 136 may transmit the output data that is generated as a result of the processing of the received command, to the command buffer 120. The command buffer 120 may receive and store the output data. The other operations of the control unit 136 may correspond to the above-described operations of the control unit 116 of the first processing core 110.

The operations of the register file 134 and the data fetch unit 135 of the second processing core 130 may correspond to the operations of the register file 114 and the data fetch unit 115 of the first processing core 110, respectively.

The shared memory 140 may be connected to the first processing core 110 and the second processing core 130. The shared memory 140 may receive data from the first processing core 110 or the second processing core 130 and store the data. The shared memory 140 may transmit the stored data to the first processing core 110 or the second processing core 130.

Figure 8:
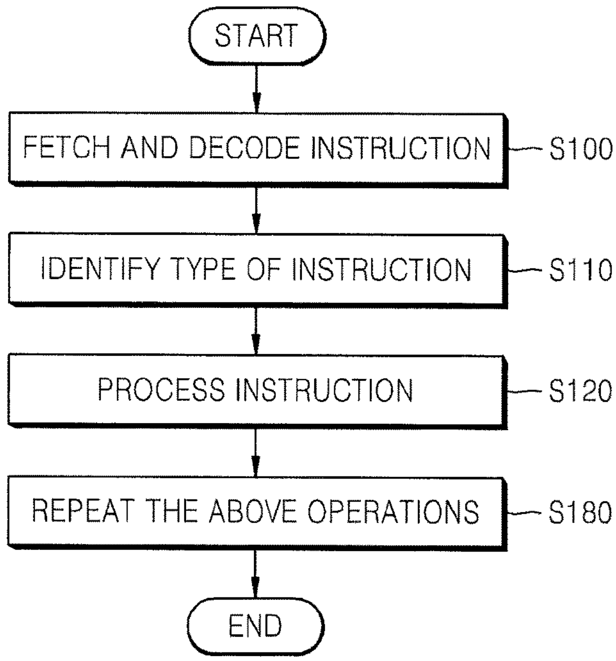
FIG. 8 is a flowchart showing a method of controlling a processor according to an embodiment.

FIG. 8 is a flowchart showing a method of controlling a processor 100 according to an embodiment. Referring to FIG. 8, in the method of controlling a processor according to an embodiment, an instruction is fetched from the instruction memory and the fetched instruction is decoded (S100).

When a program is complied, a set of instructions that are executable by the processor 100 may be generated. The set of instructions may include VLIW codes that are executable by the first processing core 110 and CGA codes that are executable by the second processing core 130. The VLIW codes may be stored in the instruction memory by a loader (not shown). Also, the CGA codes may be stored in the configuration memory 131 by the loader.

When the processor 100 is initialized, the second processing core 130 may be in a standby mode. Also, the first processing core 110 is operated to fetch the VLIW codes from the instruction memory. The first processing core 110 may decode the fetched VLIW codes.

Next, an operation of identifying a type of the decoded instruction may be performed (S110). The first processing core 110 may perform a different operation according to the type of the decoded instruction. Accordingly, the first processing core 110 may first identify the type of the decoded instruction. The decoded instruction may be, for example, an SCGA instruction, an ACGA instruction, a WAIT_ACGA instruction, a TERM_ACGA instruction, or other instructions.

Next, an operation of processing the instruction according to the identified instruction type (S120) may be performed. The first processing core 110 may process the identified instruction. A method of processing an instruction according to an instruction type will be described in detail with reference to FIG. 9.

Next, an operation of repeating the fetching and decoding of the instruction (S100) to the processing of the instruction (S120) may be performed (S180). The first processing core 110 may repeat the above operations until all instructions stored in the instruction memory are processed.

A method of processing the instruction according to the identified instruction type will be described below in detail.

Figure 9:
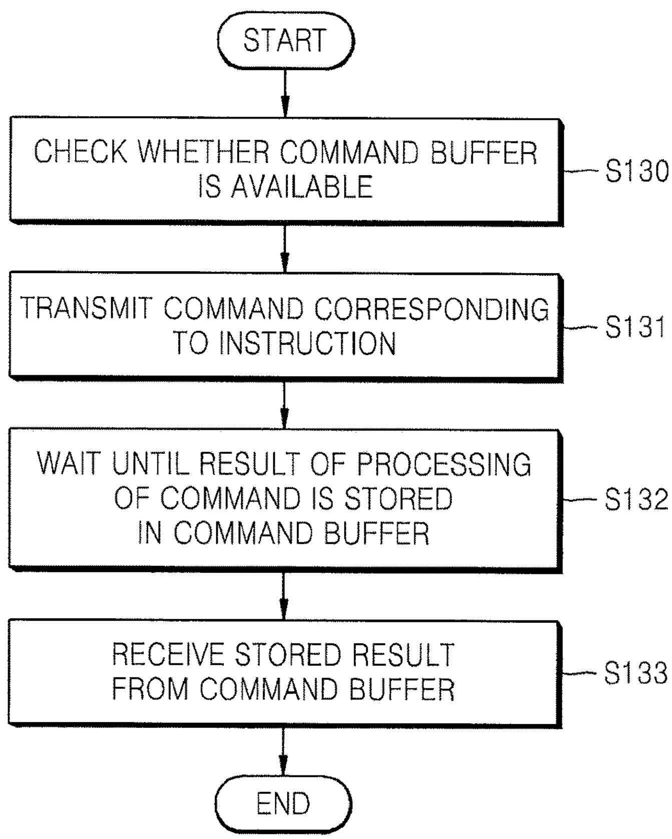
FIG. 9 is a flowchart showing a process of processing an SCGA (self-controlled genetic algorithm) instruction in a first processing core.

FIG. 9 is a flowchart showing a process of processing an SCGA instruction in the first processing core 110. In FIG. 9, the SCGA instruction may be a synchronized loop processing start instruction. When the instruction is an SCGA instruction as a result of the identifying of the instruction, the functional unit 113 of the first processing core 110 may transmit additional information related to the instruction with a signal to the control unit 116 of the first processing core 110.

Referring to FIG. 9, an operation of checking whether the command buffer 120 is available may be performed (S130). In order to check whether the command buffer 120 is available, the control unit 116 of the first processing core 110 may check whether at least one empty entry exists in the command information buffer 121 included in the command buffer 120. The control unit 116 of the first processing core 110 may perform the checking by directly accessing the command information buffer 121 or through the buffer control unit 124 of the command buffer 120.

When command information records are stored in all entries of the command information buffer 121, it may be determined that the command buffer 120 is not available. In this connection, the first processing core 110 may wait until the command buffer 120 is available.

Next, an operation of transmitting a command corresponding to the identified instruction to the command buffer 120 may be performed (S131). The control unit 116 of the first processing core 110 may generate a command by using the identified instruction and the additional information related to the instruction.

The generated command may include information about the type of a command and a parameter needed for processing the command by the second processing core 130. The information about the type of a command may correspond to the identified instruction. For example, when the identified instruction is an SCGA instruction, the information about the type of a command may include information indicating that the generated command is an SCGA command.

Also, the parameter may include, for example, at least one of an address of a configuration memory for storing instructions corresponding to a loop, a size of a loop, an ID tag value of a loop, an ID of the first processing core 110 that generated a command, a type of a command, the number of entries of input data used for processing a command, a position where the input data is stored, and the number of entries of output data. The command in the form of a signal or message may be transmitted to the command information buffer 121 of the command buffer 120.

When the processor 100 includes two or more first processing cores 110, the parameter included in the command may include an ID of the first processing core 110 that generated the command. Accordingly, the output data that is generated as a result of the processing of the command by the second processing core 130 may be transmitted to the first processing core 110 that generated the command.

Also, the input data needed for processing the command may be additionally transmitted to the command buffer 120. The input data needed for processing the command corresponding to the identified instruction may be transmitted from the register file 114 of the first processing core 110 to the input data buffer 122 of the command buffer 120. The parameter included in the command may include information about the position and size of the input data stored in the input data buffer 122.

Figure 5B:
Figure 5C:

The command illustrated in FIG. 5C may be an SCGA command. Referring to FIG. 5, the parameter included in the command may include an address ADDR of the configuration memory 131 where an instruction corresponding to a loop is stored, a size SIZE of a loop, and the number LI of entries of input data used for processing the command. The second processing core 130 may fetch an instruction from the configuration memory 131 by using the address ADDR of the configuration memory 131 and the size SIZE of a loop. The number LI of entries of the input data may include information about the number of entries of the input data that is transmitted from the register file 114 to the input data buffer 122 of the command buffer 120.

While the SCGA command is being processed by the second processing core 130, the first processing core 110 may enter a standby state. Accordingly, in this case, since it is not necessary to additionally manage a loop or a loop group, the parameter included in the SCGA command may not include a tag value TAG of a loop.

The buffer control unit 124 of the command buffer 120 may store the command in the command information buffer 121 according to a signal received from the control unit 116 of the first processing core 110. The buffer control unit 124 may convert the command to a command information record and store the command information record in the command information buffer 121. Also, the command buffer 120 may store in the input data buffer 122 the input data received from the register file 114 of the first processing core 110.

All values stored in the register file 114 of the first processing core 110 may be stored in the input data buffer 122. Also, according to another embodiment, only a value stored in predetermined some registers among the register file 114 may be stored in the input data buffer 122. Also, according to another embodiment, the value stored in at least some registers of the register file 114 may be stored in the input data buffer 122 by using the information about the position and number of the entry of the input data in use.

For example, the register file 114 of the first processing core 110 may include a total 32 registers. A field for the number LI of entries of the input data included in the command information record may have a size of four (4) bits. The $0^{th}$ bit of the LI field may correspond to the $0^{th}$ to $7^{th}$ registers of the register file 114 of the first processing core 110. Also, the $1^{st}$ bit may correspond to the $8^{th}$ to $15^{th}$ registers. Also, the $2^{nd}$ bit may correspond to the $16^{th}$ to $23^{rd}$ registers. The $3^{rd}$ bit may correspond to the $24^{th}$ to $31^{st}$ registers.

When the value stored in each bit is 1, the value included in a register corresponding to the bit may be stored in the input data buffer 122. For example, when the value of the LI field is 3 in decimal numeration, the value stored in the $0^{th}$ to $15^{th}$ registers may be stored in the input data buffer 122. Also, when the value of the LI field is 14 in decimal numeration, the value stored in the $8^{th}$ to $31^{th}$ registers may be stored in the input data buffer 122.

Referring back to FIG. 6, at least a part of the information included in the command may be included in the command information record. The information about the type of a command may be stored in an SYNC field in a data structure of the command information buffer 121. For example, information on whether the command transmitted from the first processing core 110 is an SCGA command or an ACGA command may be stored in the SYNC field.

Also, an address of the configuration memory 131 where the instruction corresponding to a loop may be stored in an ADDR field. Also, the information about the size of a loop may be stored in a SIZE field. Also, the tag value of a loop may be stored in a TAG field. Also, an ID of the first processing core 110 that generated the command may be stored in an ID field. Also, the information about the positions and number of entries of the input data used for processing the command may be stored in a PTR field and the LI field, respectively.

When the command buffer 120 is not capable of storing the received command, the first processing core 110 may wait until the command buffer 120 is capable of storing the command. For example, when the command information buffer 121 or the input data buffer 122 is in a full state, the command buffer 120 may be in a state of not capable of storing the command.

The command buffer 120 and the shared memory 140 may be accessed by both of the first processing core 110 and the second processing core 130. Accordingly, the input data needed for processing a loop may be transmitted through the command buffer 120 or the shared memory 140.

The input data needed for processing a loop may be first stored in the register file 114 of the first processing core 110 or in the shared memory 140. When the CGA instruction, the SCGA instruction, or the ACGA instruction is processed by the functional unit 113 of the first processing core 110, the input data stored in the register file 114 may be automatically transmitted to the command buffer 120.

Referring back to FIG. 9, an operation of waiting until the output data that is generated as a result of the processing of the command by the second processing core 130 that received the command from the command buffer 120 is stored in the command buffer 120 may be performed (S132).

The command buffer 120 may convert the command information record to a command and transmit the command to the second processing core 130. The second processing core 130 may receive the SCGA command from the command buffer 120. The second processing core 130 may process a loop by fetching the instruction from the configuration memory 131 according to the received SCGA command and processing the instruction. A method of processing the SCGA command by the second processing core 130 will be described in detail with reference to FIG. 10.

The result of the processing of the second processing core 130 may be stored in the command buffer 120. The first processing core 110 may continuously wait until the processing result is stored in the command buffer 120.

Next, an operation of receiving the output data from the command buffer 120 may be performed (S133). The output data that is generated as a result of the processing of the loop may be transmitted via the command buffer 120 or the shared memory 140.

The output data that is generated as a result of the processing of the loop may be first stored in the register file 134 of the second processing core 130 or in the shared memory 140. When the processing of the loop by the second processing core 130 is completed, the output data that is stored in the register file 134 of the second processing core 130 may be automatically transmitted to the output data buffer 123 of the command buffer 120. Also, the output data may be transmitted from the command buffer 120 to the register file 114 of the first processing core 110.

A speed of transmitting and receiving data through the register may be faster than a speed of transmitting and receiving data through the shared memory 140. The transmission of the input data or output data by using the register and the command buffer 120 may be completed within several cycles and automatically performed by hardware. In contrast, writing or reading data with respect to the shared memory 140 may require a long time and may be individually performed by software.

Figure 10:
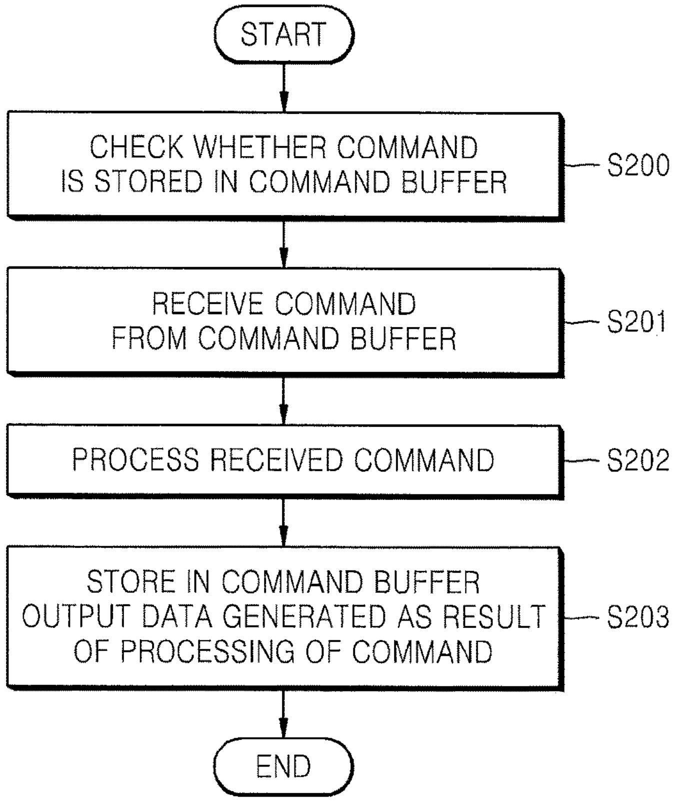
FIG. 10 is a flowchart showing a process of processing an SCGA command in a second processing core.

FIG. 10 is a flowchart showing a process of processing the SCGA command in the second processing core 130. Referring to FIG. 10, first, an operation of checking whether a command is stored in the command buffer 120 may be performed (S200).

When the second processing core 130 is in a standby state, the control unit 136 of the second processing core 130 may check whether the command buffer 120 receives a new command from the command buffer 120. The control unit 136 of the second processing core 130 may check whether at least one command information record is stored in the command information buffer 121 included in the command buffer 120. The control unit 136 of the second processing core 130 may perform the above checking by directly accessing the command information buffer 121 or through the buffer control unit 124 of the command buffer 120.

When all entries of the command information buffer 121 are empty, the second processing core 130 may wait until the command information record is stored in the command buffer 120.

Next, an operation of receiving the command from the command buffer 120 may be performed (S201). The buffer control unit 124 of the command buffer 120 may convert a command information record having the highest priority of the command information records stored in the command information buffer 121 to a command and transmit the command to the control unit 136 of the second processing core 130. Simultaneously, the input data needed for processing the command may be transmitted from the input data buffer 122 to the register file 134 of the second processing core 130.

When one first processing core 110 is included in the processor 100, the order of commands to be transmitted from the command buffer 120 to the second processing core 130 may be identical to the order of commands transmitted from the first processing core 110 to the command buffer 120.

When a plurality of first processing cores 110 are included in the processor 100, the order of commands transmitted from the command buffer 120 to the second processing core 130 may be identical to the order of commands transmitted from the first processing core 110 to the command buffer 120, among the commands transmitted from the first processing core 110 to the second processing core 130.

The control unit 136 of the second processing core 130 may store at least part of information included in the received command in the register file 134.

Next, an operation of processing the received command may be performed (S202). The control unit 136 of the second processing core 130 may wake the second processing core 130 from the standby state. The second processing core 130 may fetch the instruction from the configuration memory 131 according to the received command so that the loop may be processed. The second processing core 130 may repeatedly process the operations until the termination conditions of the loop are satisfied. The loop may be processed by the function unit 133 of the second processing core 130.

Whether the termination conditions are satisfied may be determined by using an output value of the functional unit 133 of the second processing core 130, a value stored in the register file 134, or an output value of the interconnection between the functional units 133. When it is determined that the termination conditions are satisfied, the control unit 136 may control the second processing core 130 such that the operations of elements included in the second processing core 130 may be normally completed. When the operation of each element is normally completed, the second processing core 130 may be in a standby state.

Next, an operation of storing the output data that is generated as a result of the processing of the command in the command buffer 120 may be performed (S203). The output data that is generated as a result of the processing of a loop by the functional unit 133 of the second processing core 130 may be stored in the register file 134 of the second processing core 130. The output data stored in the register file 134 may be transmitted to the output data buffer 123 of the command buffer 120 and stored therein. Also, the output data may be transmitted from the command buffer 120 to the register file 114 of the first processing core 110.

Figure 11:
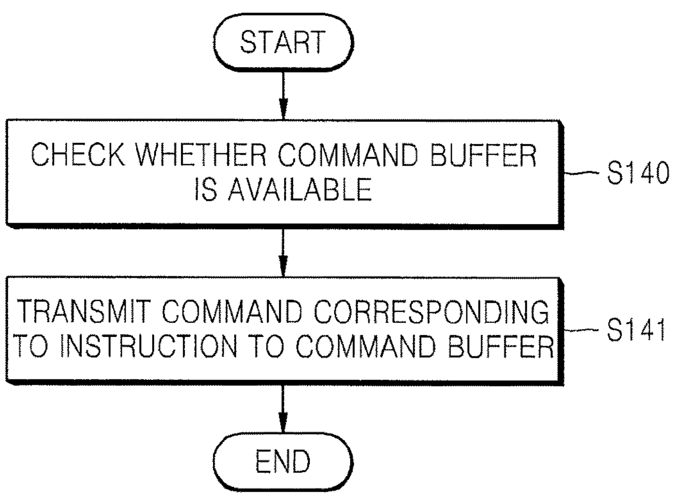
FIG. 11 is a flowchart showing a process of processing an ACGA (augmented compact genetic algorithm) instruction in the first processing core.

FIG. 11 is a flowchart showing a process of processing an ACGA instruction in the first processing core 110. The ACGA instruction may be an asynchronous loop processing start instruction. When the instruction is an ACGA instruction as a result of the identifying of the fetched instruction, the functional unit 113 of the first processing core 110 may transmit additional information related to the instruction with the control unit 116 of the first processing core 110.

Referring to FIG. 11, first, an operation of checking whether the command buffer 120 is available may be formed (S140). In order to check whether the command buffer 120 is available, the control unit 116 of the first processing core 110 may check whether at least one empty entry exists in the command information buffer 12 included in 1 the command buffer 120. The control unit 116 of the first processing core 110 may perform the checking by directly accessing the command information buffer 121 or through the buffer control unit 124 of the command buffer 120.

When the command information record is stored in all entries of the command information buffer 121, it may not be determined that the command buffer 120 is available. In this case, the first processing core 110 may wait until the command buffer 120 is available.

Next, an operation of transmitting a command corresponding to the identified instruction to the command buffer 120 may be performed (S141). The control unit 116 of the first processing core 110 may generate a command by using the identified instruction and additive information related to the instruction.

The generated command may include the information about the type of the command and the parameter that is needed for processing the command by the second processing core 130. When the processor 100 includes two or more first processing cores 110, the parameter included in the command may include an ID of the first processing core 110 that generated the command. Accordingly, the output data that is generated as a result of the processing of the command by the second processing core 130 may be transmitted to the first processing core 110 that generated the command.

Also, the input data needed for processing the command may be additionally transmitted to the command buffer 120. In detail, the input data needed for processing the command corresponding to the identified instruction may be transmitted from the register file 114 of the first processing core 110 to the input data buffer 122 of the command buffer 120. The parameter included in the command may include information about the position and size of the input data stored in the input data buffer 122.

The command illustrated in FIG. 5B may be an ACGA command. Referring to FIG. 5, the parameter included in the command may include the address ADDR of the configuration memory 131 where the instruction corresponding to a loop is stored, a size SIZE of the loop, the number LI of entries of the input data used for processing the command, and an ID tag value TAG of the loop.

The second processing core 130 may fetch the instruction from the configuration memory 131 by using the address ADDR of the configuration memory 131 and the size SIZE of a loop. The number LI of entries of the input data may include information about the number of entries of the input data transmitted from the register file 114 to the input data buffer 122 of the command buffer 120.

The tag value TAG may be an identifier that is assigned to each loop by a programmer or a compiler. The tag value TAG may use used for identifying and managing each loop or loop group. Two different loops in a program may have addresses of different configuration memories. However, the tag value assigned to each of the two loops may be identical. Also, the tag values assigned to the two loops may be different from each other.

The buffer control unit 124 of the command buffer 120 may store the command in the command information buffer 121 according to a signal received from the control unit 116 of the first processing core 110. The buffer control unit 124 may convert the command to a command information record and store the command information record in the command information buffer 121. Also, the command buffer 120 may store the input data received from the register file 114 of the first processing core 110 in the input data buffer 122.

When the command buffer 120 is not able to store the received command, the first processing core 110 may wait until the command buffer 120 is able to store the command. For example, when the command information buffer 121 or the input data buffer 122 is in a full state, the command buffer 120 may be in a state not capable of storing the command.

The first processing core 110 may transmit the command to the command buffer 120 and then process the instruction. In other words, the first processing core 110 may process the instruction without having to wait for completion of processing of the ACGA command by the second processing core 130. When the first processing core 110 starts to process a next instruction, the command may be stored in the command buffer 120. Also, when the first processing core 110 starts to process the next instruction, the second processing core 130 may process the command.

Accordingly, the first processing core 110 and the second processing core 130 may operate in parallel.

The output data that is generated as a result of the processing of the ACGA command by the second processing core 130 may not be directly transmitted to the register file 114 of the first processing core 110. Accordingly, the output data may be programmed to be stored in the shared memory 140.

Figure 12:
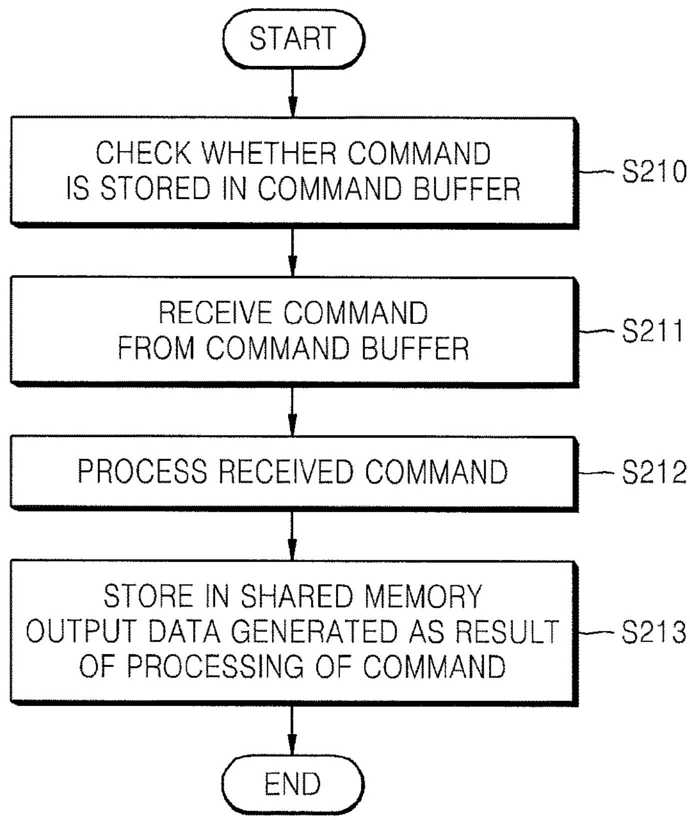
FIG. 12 is a flowchart showing a process of processing an ACGA command in the second processing core.

FIG. 12 is a flowchart showing a process of processing an ACGA command in the second processing core 130. Referring to FIG. 12, first, an operation of checking whether the command is stored in the command buffer 120 may be performed (S210).

When the second processing core 130 is in a standby state, the control unit 136 of the second processing core 130 may check whether the command buffer 120 receives a new command from the command buffer 120. The control unit 136 of the second processing core 130 may check whether at least one command information record is stored in the command information buffer 12 included in 1 the command buffer 120. The control unit 136 of the second processing core 130 may perform the checking by directly accessing the command information buffer 121 or through the buffer control unit 124 of the command buffer 120.

When all entries of the command information buffer 121 are empty, the second processing core 130 may wait until the command information record is stored in the command buffer 120.

Next, an operation of receiving the command from the command buffer 120 may be performed (S211). The buffer control unit 124 of the command buffer 120 may convert a command information record having the highest priority among the command information records stored in the command information buffer 121 to a command and transmit the command to the control unit 136 of the second processing core 130. Simultaneously, the input data for processing the command may be transmitted from the input data buffer 122 to the register file 134 of the second processing core 130.

Next, an operation of processing the received command may be performed (S212). The control unit 136 of the second processing core 130 may wake the second processing core 130 from the standby state. The second processing core 130 may fetch the instruction from the configuration memory 131 according to the received command so that the loop may be processed. The second processing core 130 may repeatedly process the operations until the termination conditions of the loop are satisfied. The loop may be processed by the function unit 133 of the second processing core 130.

Next, an operation of storing the output data that is generated as a result of the processing of the command in the shared memory 140 may be performed (S213). The output data that is generated as a result of the processing of the loop by the functional unit 133 of the second processing core 130 may be stored in the register file 134 of the second processing core 130. The output data stored in the register file 134 may be transmitted to the shared memory 140 and stored therein.

As described above with reference to FIGS. 9 to 12, at least two types of CGA commands may be provided. The two types of CGA commands may include an SCGA command and an ACGA command may be different in whether or not the first processing core 110 is operated in parallel while the second processing core 130 processes the loop. When the second processing core 130 processes the SCGA command and the output data is generated, the output data may be transmitted from the register file 134 of the second processing core 130 to the register file 114 of the first processing core 110 through the command buffer 120.

In contrast, the first processing core 110 may process later instructions without having to wait that the second processing core 130 processes the ACGA command. When the second processing core 130 processes the ACGA command and the output data is generated, the output data may be transmitted from the register file 134 of the second processing core 130 to the shared memory 140 and stored therein.

Figure 13:
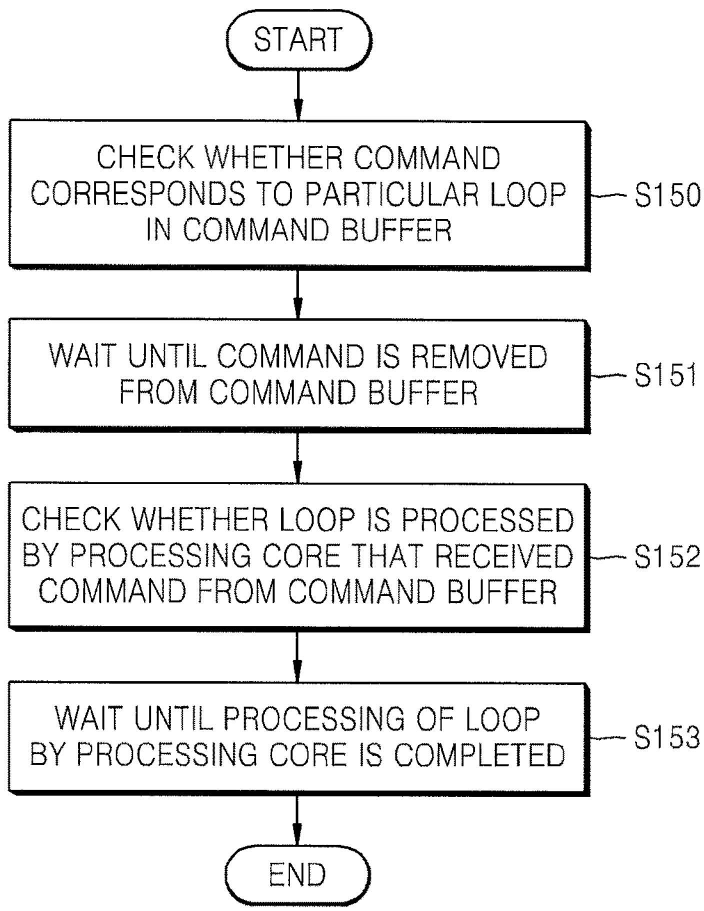
FIG. 13 is a flowchart showing a process of processing a WAIT_ACGA instruction in the first processing core.

FIG. 13 is a flowchart showing a process of processing a WAIT_ACGA instruction in the first processing core 110. As described above, the first processing core 110 may be operated in parallel with the second processing core 130 by using the ACGA command. According to another embodiment, the first processing core 110 may wait until the second processing core 130 completes the termination of the ACGA command after the first processing core 110 processes in parallel other instruction.

For example, no instruction may be included in the program which may be processed in parallel by the first processing core 110. Also, the first processing core 110 may use the output data that is generated as a result of the processing of the ACGA command by the second processing core 130. In this case, the first processing core 110 may wait until the second processing core 130 completes termination of the ACGA command after the first processing core 110 processes in parallel other instruction.

Also, in this case, the compiler or the programmer may allow the WAIT_ACGA instruction to be processed by the first processing core 110. The WAIT_ACGA instruction may be an instruction intending to wait until the process of a loop is completed.

Referring to FIG. 13, an operation of checking whether a command corresponding to a particular loop is stored in the command buffer 120 may be performed (S150). When the functional unit 113 of the first processing core 110 identifies the WAIT_ACGA instruction, the control unit 116 of the first processing core 110 may generate a WAIT_ACGA command. The command illustrated in FIG. 5D may be the WAIT_ACGA command. Referring to FIG. 5, the parameter included in the command may include information about the ID tag value TAG of a loop. The tag value TAG may be used for the first processing core 110 to identify a target loop whose processing is to be terminated.

The control unit 116 of the first processing core 110 may transmit the command to the buffer control unit 124 of the command buffer 120. The buffer control unit 124 of the command buffer 120 may check whether at least one command information record including the tag value is stored in the command information buffer 121 by using the tag value included in the command. In other words, the command buffer 120 may compare the tag value included in the command and the tag value stored in each entry of the command information buffer 121. The buffer control unit 124 may transmit a result of the comparison to the control unit 116 of the first processing core 110.

When the processor 100 includes two or more first processing cores 110, the parameter included in the WAIT_ACGA command may further include the ID of the first processing 110 that generated the command. When a plurality of first processing cores 110 exist, a loop may not be specified with a tag value of the loop. Accordingly, the loop may be specified by additionally using the ID of the first processing core 110 that generated the command. The command buffer 120 may perform the comparison by using the tag value of the loop and the ID of the first processing core 110 included in the command.

Next, an operation of waiting until the command is removed from the command buffer 120 may be performed (S151). When at least one command information record including the tag value included in the command is to be stored in the command information buffer 121, the first processing core 110 may wait until the command information record is removed from the command information buffer 121. In other words, the first processing core 110 may wait until the command information record is removed from the command information buffer 121 as the second processing core 130 receives a command corresponding to the command information record from the command buffer 120.

Next, an operation of checking whether the second processing core 130 that received the command from the command buffer 120 processes the loop may be performed (S152). The control unit 116 of the first processing core 110 may transmit the WAIT_ACGA command to the control unit 136 of the second processing core 130.

The control unit 136 of the second processing core 130 may check, by using the tag value included in the command, whether the functional unit 133 of the second processing core 130 processes a loop corresponding to the tag value. In other words, the tag value of a loop that is currently processed by the second processing core 130 and the tag value included in the command.

When the processor 100 includes two or more first processing cores 110, the parameter included in the WAIT_ACGA command may further include the ID of the first processing core 110 that generated the command. When a plurality of first processing cores 110 exist, a loop may not be specified with a tag value of the loop only and thus the loop may be specified by additionally using the ID of the first processing core 110 that generated the command information record. The second processing core 130 may perform the comparison by using the tag value of the loop and the ID of the first core 110 included in the command.

Next, an operation of waiting until the second processing core 130 completes the processing to the loop may be performed (S153). The control unit 136 of the second processing core 130 may transmit a result of the comparison to the control unit 116 of the first processing core 110. When the second processing core 130 processes the loop, the first processing core 110 may wait until the second processing core 130 completes the processing the loop.

Figure 5D:
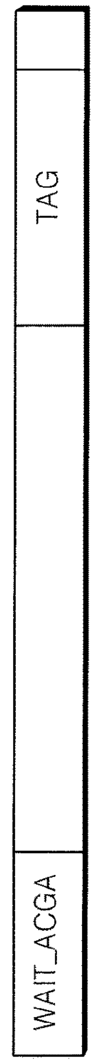

Also, according to another embodiment, unlike an embodiment illustrated in FIG. 5D, the WAIT_ACGA command may not include the information about the tag value TAG or may include a dummy value as a tag value.

The control unit 116 of the first processing core 110 may transmit the command to the buffer control unit 124 of the command buffer 120. The buffer control unit 124 of the command buffer 120 may check whether at least one command information record is stored in the command information buffer 121. The buffer control unit 124 may transmit a result of the checking to the control unit 116 of the first processing core 110.

When at least one command information record is stored in the command information buffer 121, the first processing core 110 may wait until all stored command information records are removed from the command information buffer 121. In other words, the first processing core 110 may wait until all command information records stored in the command information buffer 121 are removed as the second processing core 130 receives a command corresponding to the command information record from the command buffer 120.

Also, the control unit 116 of the first processing core 110 may transmit the WAIT_ACGA command that does not include the information about the tag value TAG to the control unit 136 of the second processing core 130.

The control unit 136 of the second processing core 130 may check whether the functional unit 133 processes the loop. The control unit 136 of the second processing core 130 may transmit a result of the checking to the control unit 116 of the first processing core 110. When the second processing core 130 processes the loop, the first processing core 110 may wait until the second processing core 130 completes the processing of the loop.

When the WAIT_ACGA command that does not include the information about the tag value is used as above, the first processing core 110 may wait until all ACGA commands that the first processing core 110 transmitted to the command buffer 120 are processed by the second processing core 130.

Also, according to another embodiment, the first processing core 110 may transmit a WAIT_ACGA_ALL command to the command buffer 120 or the second processing core 130. The WAIT_ACGA_ALL command may not include information about the tag value or may be processed in a method similar to that method for processing the WAIT_ACGA command including a dummy value as the tag value.

Figure 14:
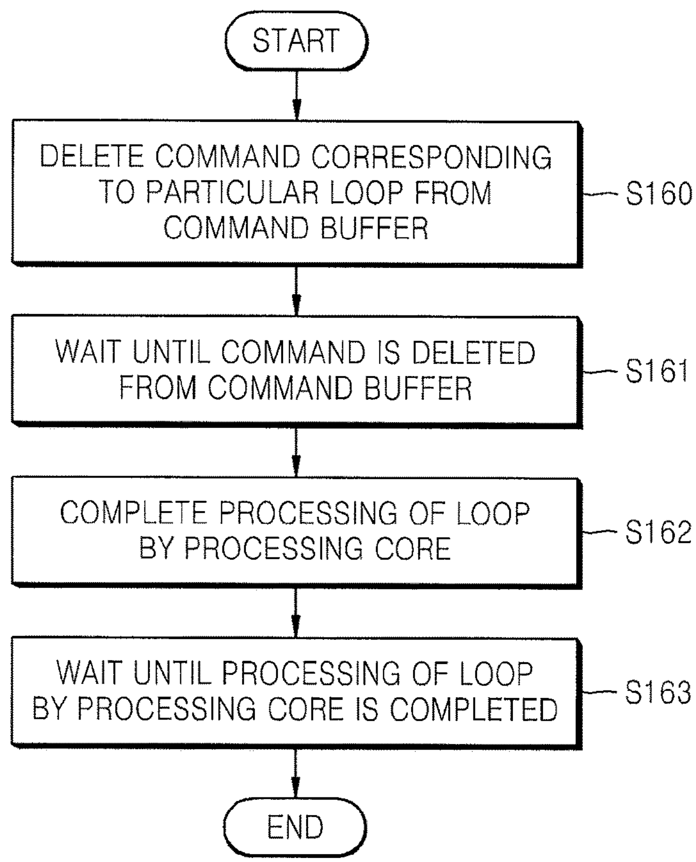
FIG. 14 is a flowchart showing a process of processing a TERM_ACGA command in the first processing core.

FIG. 14 is a flowchart showing a process of processing a TERM_ACGA command in the first processing core 110. Referring to FIG. 14, for example, the processor 100 processes a program that handles interrupts or a case in which the processor 100 processes system software. In this case, after the first processing core 110 transmits the ACGA command to the command buffer 120, the first processing core 110 may abort or cancel that the ACGA command is processed by the second processing core 130.

Also, in this case, the programmer may allow the TERM_ACGA instruction to be processed by the first processing core 110. Also, the compiler may allow the TERM_ACGA instruction to be processed by the first processing core 110. The TERM_ACGA instruction may be an instruction intending to forcibly terminate the processing of the loop.

Referring to FIG. 14, first, an operation of deleting the command corresponding to a particular loop from the command buffer 120 may be performed (S160). When the functional unit 113 of the first processing core 110 identifies the TERM_ACGA instruction, the control unit 116 of the first processing core 110 may generate the TERM_ACGA command.

Figure 5E:
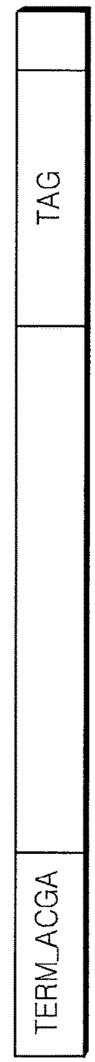

The command of FIG. 5E may be a TERM_ACGA command. Referring to FIG. 5, the parameter included in the command may include information about the ID tag value Tag of the loop. The tag value TAG may be used for identifying a target loop whose processing is to be forcibly terminated.

The control unit 116 of the first processing core 110 may transmit the command to the buffer control unit 124 of the command buffer 120. The buffer control unit 124 of the command buffer 120 may check, by using the tag value included in the command, whether at least one command information record including the tag value is stored in the command information buffer 121. In other words, the command buffer 120 may compare the tag value included in the command and the tag value stored in each entry of the command information buffer 121.

When the processor 100 includes two or more first processing cores 110, the parameter included in the TERM_ACGA command may further include an ID of the first processing core 110 that generated the command. When a plurality of first processing cores 110 exist, the loop may not be specified with the tag value of the loop only and thus the loop may be specified by additionally using the ID of the first processing core 110 that generated the command. The command buffer 120 may perform the comparison by using the ID of the first processing core 110 included in the command and the tag value of the loop.

When the at least one command information record including the tag value is stored in the command information buffer 121, the buffer control unit 124 of the command buffer 120 may delete the at least one command information record including the tag value from the command information buffer 121. In other words, the command information record may be deleted before the command corresponding to the command information record is transmitted to the second processing core 130.

Next, an operation of waiting until the command is deleted from the command buffer 120 may be performed (S161). Deleting the command information record corresponding to the command from the command buffer 120 may take some time. The first processing core 110 may wait until all command information records may be deleted from the command buffer 120. In other words, the deleting of the command information record may be performed by a blocking method.

Also, according to another embodiment, the first processing core 110 may perform a next operation without having to wait for the completion of the deleting of the command information record. In other words, the deleting of the command information record may be performed by a non-blocking method.

Next, an operation of terminating the processing of the loop by the second processing core 130 may be performed (S162). The control unit 116 of the first processing core 110 may transmit the TERM_ACGA command to the control unit 136 of the second processing core 130.

The control unit 136 of the second processing core 130 may check, by using the tag value included in the command, whether the functional unit 133 of the second processing core 130 processes the loop corresponding to the tag value. In other words, the tag value of the loop that is currently being processed by the second processing core 130 and the tag value included in the command may be compared with each other.

When the processor 100 includes two or more first processing cores 110, the parameter included in the TERM_ACGA command may further include an ID of the first processing core that generated the command. When a plurality of first processing cores 110 exist, the loop may not be specified with the tag value of the loop only and thus the loop may be specified by additionally using the ID of the first processing core 110 that generated the command information record. The second processing core 130 may perform comparison between the ID of the first processing core 110 included in the command and the tag value of the loop.

While the functional unit 133 of the second processing core 130 processes the loop corresponding to the tag value, the control unit 136 of the second processing core 130 may terminate the processing of the loop. In other words, the control unit 136 may terminate the processing of the loop before the processing of the loop is completed.

Next, an operation of waiting until the processing of the loop is terminated may be performed (S163). Terminating the processing of the loop in the second processing core 130 may take some time. The first processing core 110 may wait until the processing of the loop in the second processing core 130 is terminated. In other words, the termination of the processing of the loop may be performed by the blocking method. When the termination of the processing of the loop is performed by the blocking method, the first processing core 110 may process a next instruction after the processing the loop is terminated.

Also, according to another embodiment, the first processing core 110 may perform a next operation without having to wait for the termination of the processing of the loop. In other words, the termination of the processing of the loop may be performed by the non-blocking method.

When the termination of the processing of the loop is performed by the non-blocking method, the first processing core 110 may process a next instruction without having to wait the termination of the processing of the loop. Accordingly, the first processing core 110 and the second processing core 130 may operate in parallel. The first processing core 110 may check later, by using the WAIT_ACGA command including the tag value corresponding to the loop, whether the processing of the loop is terminated.

Figure 16:
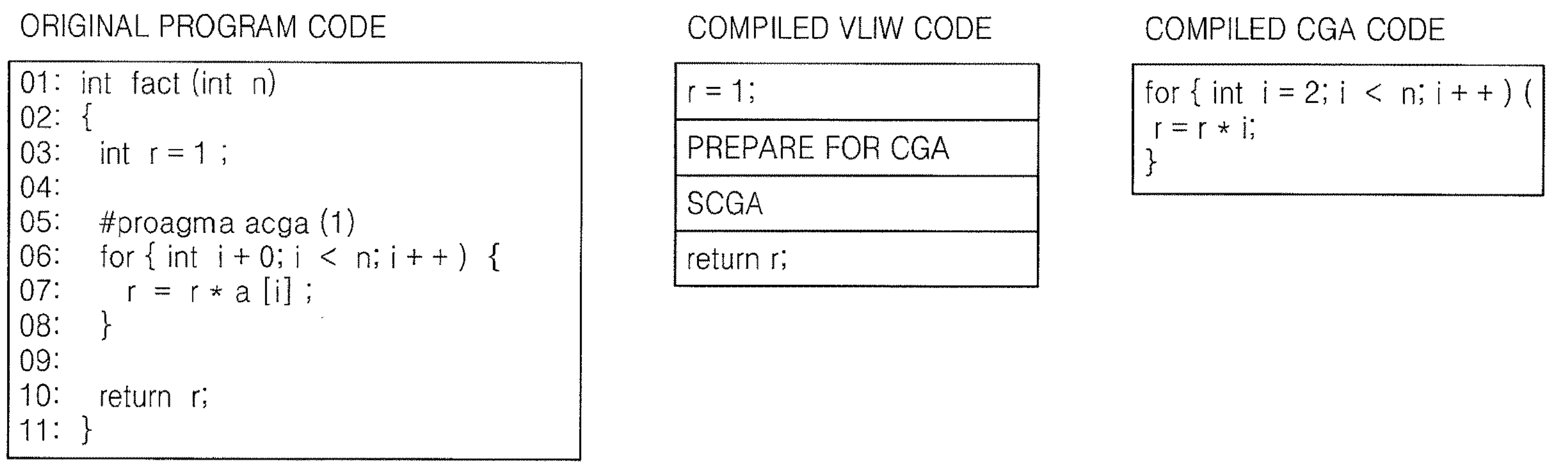
FIG. 16 illustrates a source program and a complied program according to another embodiment.

FIG. 15 illustrates a source program and a complied program according to an embodiment. FIG. 16 illustrates a source program and a complied program according to another embodiment.

When a program is compiled, a portion of the complied program that may be processed by the first processing core 110 may be basically generated. Also, another portion of the compiled program that is processed by the second processing core 130 may be generated from a portion of the program where the processing of the loop is accelerated. Whether a particular portion of the program is a portion where the processing of the loop is accelerated may be set directly by the programmer or determined by the compiler.

When the portion where the processing of the loop is accelerated (hereinafter, referred to as the loop) is detected, the compiler may generate a code for transmitting data needed by the second processing core 130 to process the loop or a code for preparing for the processing of the loop. The generated code may be processed by the first processing core 110. The generated code may include a code for storing necessary data in the register file 114 of the first processing core 110 or the shared memory 140.

Also, the compiler may generate a code that corresponds to the loop and is processed by the second processing core 130. Also, the compiler may generate a code based on a portion of the program which may be processed in parallel with the loop. The code may be processed by the first processing core 110.

Whether a particular portion of the program is processed in parallel with the loop may be set directly by the programmer or determined by the compiler.

Referring to FIG. 15 or 16, a portion where the processing of the loop is accelerated is set by using "#pragma" that is a directive of the C language. "acga(1)" of FIG. 15 may correspond to the ACGA instruction. Also, "wait_acga(1)" of FIG. 15 may correspond to the WAIT_ACGA instruction. Also, "scga" of FIG. 16 may correspond to the SCGA instruction.

As the programmer creates a code such as "#pragma acga(1)" or "#pragma scga", the portion where the processing of the loop is accelerated may be set. Also, since a code in the $13^{th}$ row of FIG. 15 needs the output data that is generated as a result of the processing of the loop, by creating a code such as "#pragma wait_acga(1)", the first processing core 110 may wait until the processing of the loop is completed.

A code "average( )" of FIG. 15 may be a function for producing a geometric mean. According to "#pragma acga (1)" in the $5^{th}$ row of FIG. 15, the loop from the $6^{th}$ to $8^{th}$ rows may be processed by the second processing core 130. Also, the first processing core 110 may process the code in the $10^{th}$ row without having to wait for the completion of the processing of the loop. Since a lot of time is probably spent for processing the code in the $10^{th}$ row, by setting as above, the code in the $10^{th}$ row and the loop may be processed in parallel by the first processing core 110 and the second processing core 130, respectively.

Also, according to "#pragma wait_acga(1)" in the $12^{th}$ row of FIG. 15, the first processing core 110 may wait until the processing of the loop is completed. The first processing core 110 may process the code in the $13^{th}$ row by using the output data that is generated as a result of the processing of the loop. The numbers in parenthesis from the $5^{th}$ to $12^{th}$ rows in FIG. 5 indicate tag values of the ID of the loop. Referring to FIG. 16, since there is no code to be processed in parallel with the loop from the $6^{th}$ to $8^{th}$ rows, "#pragma scga" may be used.

The compiler may generate a code including the SCGA instruction, the ACGA instruction, or the WAIT_ACGA instruction by using the code including "#pragma". Also, the compiler may independently generate a code including the SCGA instruction, the ACGA instruction, or the WAIT_ACGA instruction regardless of the code including "#pragma".

Figure 17B:
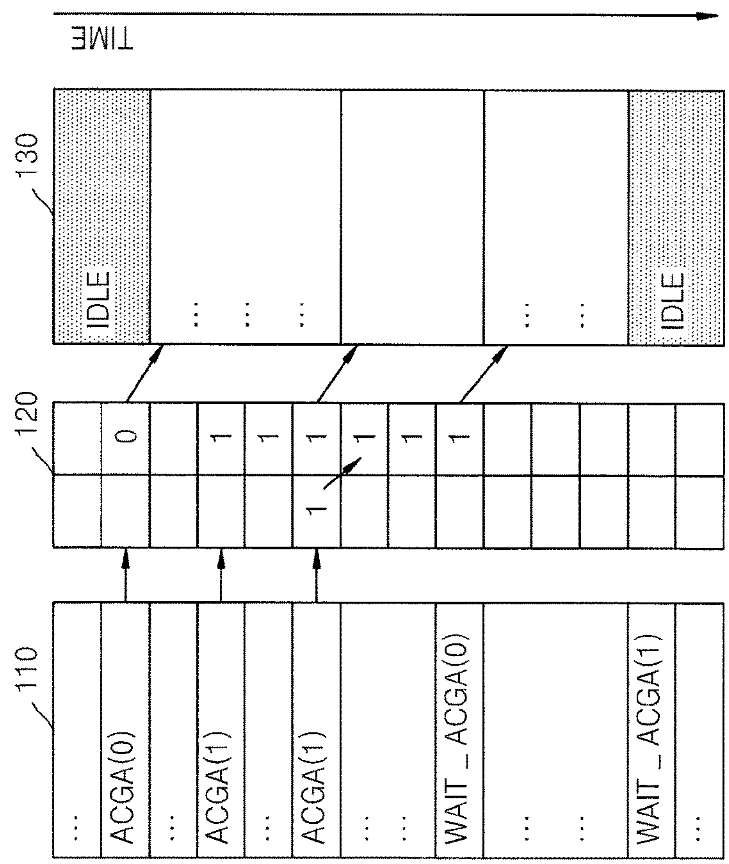
FIGS. 17A AND 17B illustrate a total processing time according to the existence of a command buffer included in a processor.
Figure 17A:
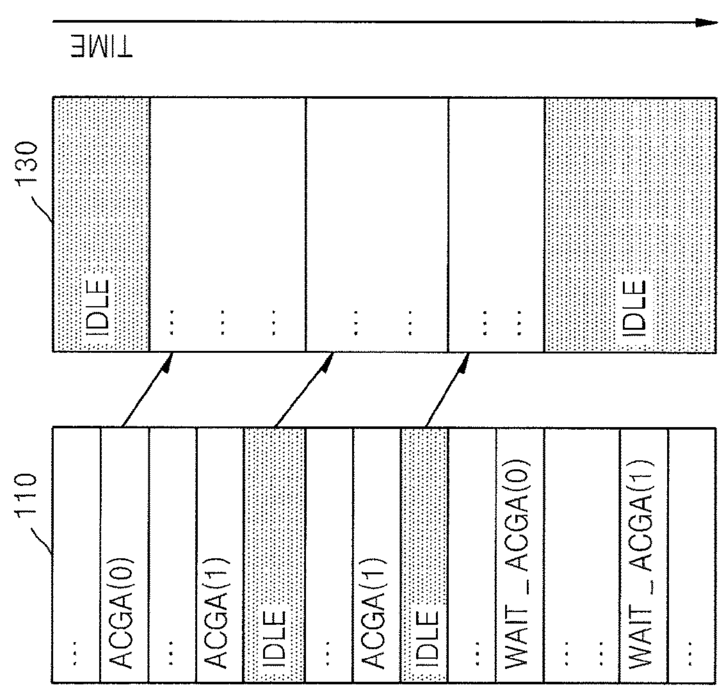

FIG. 17 illustrates a total processing time according to the presence of the command buffer 120 included in the processor 100. FIG. 17A illustrates a process of processing a program by using the processor 100 that does not include the command buffer 120. Also, FIG. 17B illustrates a process of processing a program by using the processor 100 that includes the command buffer 120.

Referring to FIGS. 17A and B, when the first processing core 110 starts to process a second ACGA instruction, the second processing core 130 may still process the first loop. In an example illustrated in FIG. 17A, the first processing core 110 may wait until the second processing core 130 completes the processing of the first loop.

In contrast, in an example illustrated in FIG. 17B, the first processing core 110 may process a next instruction without having to wait until the second processing core 130 completes the processing of the first loop. In other words, in the example illustrated in FIG. 17B, unless the command buffer 120 is full, the first processing core 110 may process the next instruction without having to wait until the second processing core 130 completes the processing of the loop. In the example illustrated in FIG. 17B, after the processing of the first loop is completed, the second processing core 130 may receive a command corresponding to the second loop from the command buffer 120 and process the command.

Accordingly, in the example illustrated in FIG. 17B, compared to the example of FIG. 17A, the first processing core 110 and the second processing core 130 may process most parts of a program in parallel. Also, in the example illustrated in FIG. 17B, a total time needed for processing the program may be shorter than that in the example of FIG. 17A. In other words, when the processor 100 including the command buffer 120 is in use, the total time needed for processing the program may be relatively short.

Even when the processor 100 that does not include the command buffer 120 is in use, the programmer may optimize a program so that the first processing core 110 and the second processing core 130 may process the program in parallel as much as possible. The optimized program may have low readability.

Also, optimizing a program may be complicated and time-consuming. In addition, optimizing a program may be very difficult due to a memory access time varying with a cache state or a bus state, a condition statement allowing an executed code to vary according to various conditions, the number of repetitions of a loop varying with a variable value, or other factors.

As described above, the cores included in the processor according to the one or more of embodiments may operate in parallel. Also, according to embodiments, the processing speed of a processor may be increased.

Also, according to the above-described embodiments, the work load of a programmer or the load of a parallel processing compiler of a processor may be reduced.

It should be understood that exemplary embodiments described herein should be considered in a descriptive sense only and not for purposes of limitation. Descriptions of features or aspects within each embodiment should typically be considered as available for other similar features or aspects in other embodiments.

One or programs described herein may be recorded, stored, or fixed in one or more non-transitory computer-readable media (computer readable storage (recording) media) for execution by one or more processing cores.

While one or more embodiments have been described with reference to the accompanying figures, it will be understood by those of ordinary skill in the art that various changes in form and details may be made therein without departing from the spirit and scope of the present disclosure as defined by the following claims.

What is claimed is:

1. A method of controlling a processor, the method comprising:

receiving, from a command buffer, a first command corresponding to a first instruction that is processed by a second processing core, and starting processing of the first command by a first processing core;

storing, in the command buffer, a second command corresponding to a second instruction that is processed by the second processing core before the processing of the first command is completed by the first processing core, the first instruction being associated with a part of a program different from another part of the program associated with the second instruction; and starting processing of a third instruction by the second processing core before the processing of the first command is completed by the first processing core.

2. The method of claim 1, further comprising, after the starting processing of the third instruction by the second processing core, receiving the second command from the command buffer and starting processing of the second command by the first processing core.

3. A method of controlling a processor, the method comprising:

processing a first instruction by a first processing core;

storing a first command corresponding to the first instruction in a command buffer;

receiving the first command from the command buffer and starting processing of the first command by a second processing core;

processing a second instruction by the first processing core, before the processing of the first command is completed by the second processing core, the first instruction being associated with a part of a program different from another part of the program associated with the second instruction;

storing a second command corresponding to the second instruction in the command buffer before the processing of the first command is completed by the second processing core; and starting processing of a third instruction by the first processing core, before the processing of the first command is completed by the second processing core.

4. The method of claim 3, further comprising, after the starting of the processing of the third instruction by the first processing core, receiving the second command from the command buffer by the second processing core and starting processing the second command.

5. A method of controlling a processor, the method comprising:

fetching an instruction and decoding the fetched instruction, which is performed by a first processing core;

identifying a type of the decoded instruction;

storing a command according to the type of the decoded instruction in a command buffer; and receiving the command from the command buffer and starting processing the command, which is performed by a second processing core, wherein the fetched instruction performed by the first processing core is associated with a part of a program different from another part of the program associated an instruction associated with the command received from the command buffer by the second processing core.

6. The method of claim 5, wherein:

the command comprises information about a type of the command and a parameter for processing the command, and the storing of the command comprises:

waiting until the command buffer is available; and storing the command in the command buffer.

7. The method of claim 5, further comprising, after the receiving of the command and the starting of the processing of the command:

waiting until output data that is generated as a result of the processing of the command by the second processing core is stored in the command buffer by the first processing core; and receiving the output data from the command buffer by the first processing core.

8. The method of claim 5, further comprising, between the storing of the command and the receiving the command and the starting of the processing of the command, processing a next instruction to the instruction by the first processing core.

9. The method of claim 8, further comprising, after the processing of the next instruction:

allowing the first processing core to wait until the command is transmitted from the command buffer to the second processing core; and allowing the first processing core to wait until the processing of the command by the second processing core is completed.

10. The method of claim 8, further comprising, after the processing of the next instruction, deleting the command from the command buffer.

11. The method of claim 8, further comprising, after the processing of the next instruction, terminating the processing of the command by the second processing core.

12. The method of claim 11, further comprising, after the terminating of the processing of the command, processing first instruction after the next instruction by the first processing core, while the processing of the command is terminated.

13. A processor comprising:

a first processing core to process a first instruction;

a command buffer to receive a first command corresponding to the first instruction from the first processing core and to store the first command; and a second processing core to receive the first command from the command buffer and to process the first command, wherein the command buffer receives a second command from the first processing core and stores the second command before the processing of the first command is completed by the second processing core, and wherein the first processing core starts processing of a second instruction corresponding to the second command before the processing of the first command is completed by the second processing core, and the first instruction is associated with a part of a program different from another part of the program associated with the second instruction.

14. The processor of claim 13, wherein the second processing core receives the second command from the command buffer and processes the second command after the processing of the first command is completed.

15. A processor comprising:

a first processing core to process an instruction that is fetched and to generate a command corresponding to the instruction;

a command buffer to receive the command from the first processing core and to store the command; and a second processing core to receive the command from the command buffer, wherein the command comprises information about a type of the command and a parameter for processing the command, and the instruction fetched being associated with a part of a program different from another part of the program to be processed by the second processing core, and wherein the second processing core processes the command by using the parameter.

16. The processor of claim 15, wherein the command buffer receives output data that is generated as a result of the processing of the command by the second processing core and stores the output data.

17. The processor of claim 16, wherein the first processing core receives the output data from the command buffer.

18. The processor of claim 15, wherein the command buffer comprises:

a command information buffer to receive the command from the first processing core and to store the command;

an input data buffer to receive input data for processing the command from the first processing core and to store the input data;

an output data buffer to receive output data that is generated as a result of the processing of the command from the second processing core and to store the output data; and a buffer controller to control the command information buffer, the input data buffer, and the output data buffer.

19. The processor of claim 18, wherein the second processing core receives the input data from input data buffer and the second processing core processes the command by using the parameter and the input data.

20. The processor of claim 15, wherein the first processing core waits until output data that is generated as a result of the processing of the command by the second processing core is stored in the command buffer.

21. The processor of claim 15, wherein the first processing core processes a second instruction while the command and stored in the command buffer or the command is processed by the second processing core.

22. The processor of claim 21, wherein, after processing the second instruction, the first processing core waits until the processing of the command by the second processing core is completed.

23. The processor of claim 21, wherein, after processing the second instruction, the first processing core deletes the command from the command buffer.

24. The processor of claim 21, wherein, after processing the second instruction, the first processing core terminates the processing of the command by the second processing core.

25. The processor of claim 24, wherein the first processing core processes a third instruction while the processing of the command is terminated.

26. The processor of claim 15, wherein the second processing core fetches an instruction that is stored in a configuration memory, according to the received command, and processes the instruction.

27. The processor of claim 26, wherein the instruction fetched by the second processing core corresponds to a loop of the program.

* * * * *